United States Patent [19]
Walker et al.

[11] Patent Number: 5,018,190
[45] Date of Patent: May 21, 1991

[54] DEVICE TO BLOCK UNAUTHORIZED MODEM ACCESS OVER A PBX LINE

[75] Inventors: Richard C. Walker, Palo Alto; Hans von Braun, San Francisco, both of Calif.

[73] Assignee: Hewlett-Packard Company, Palo Alto, Calif.

[21] Appl. No.: 410,689

[22] Filed: Sep. 21, 1989

[51] Int. Cl.⁵ .......................................... H04M 11/00
[52] U.S. Cl. ................................................... 379/95
[58] Field of Search ................ 379/95, 93, 96, 97, 379/98, 106, 107; 375/5; 455/218, 228; 381/56, 58

[56] References Cited

U.S. PATENT DOCUMENTS

| | | | |
|---|---|---|---|
| 4,626,623 | 12/1986 | LaHaye | 379/95 |
| 4,707,804 | 11/1987 | Leal | 379/95 |
| 4,815,031 | 3/1989 | Furukawa | 379/95 |
| 4,815,137 | 3/1989 | Benvenuto | 379/98 |
| 4,833,706 | 5/1989 | Hughes-Hartogs | 379/98 |
| 4,852,151 | 7/1989 | Dittakavi et al. | 379/93 |

*Primary Examiner*—Jin F. Ng
*Assistant Examiner*—Stella L. Woo

[57] ABSTRACT

A modem detector that enables detection of whether a modem is coupled to a phone line. When one is detected, various responses can occur, including: hanging up on the modem; checking if the modem linkage is allowable and, if it is not, then hanging up on the modem; and/or logging in the occurrence of an unauthorized modem access. To provide protection against unauthorized modem access, a digital embodiment can be used at the T1 phone line or an analog embodiment can be used after digital telephone data is converted into analog signals.

16 Claims, 4 Drawing Sheets

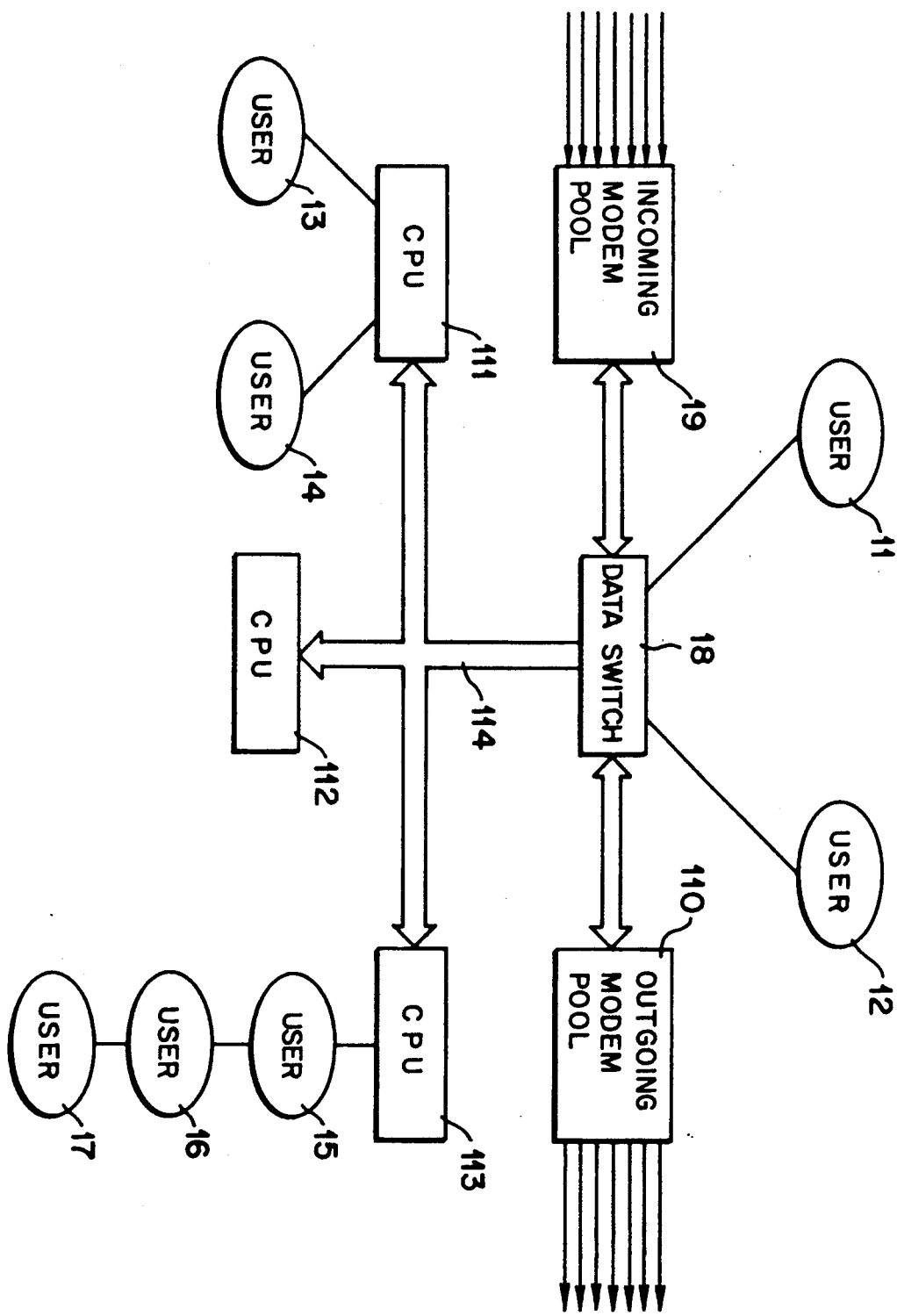
FIG_1 (PRIOR ART)

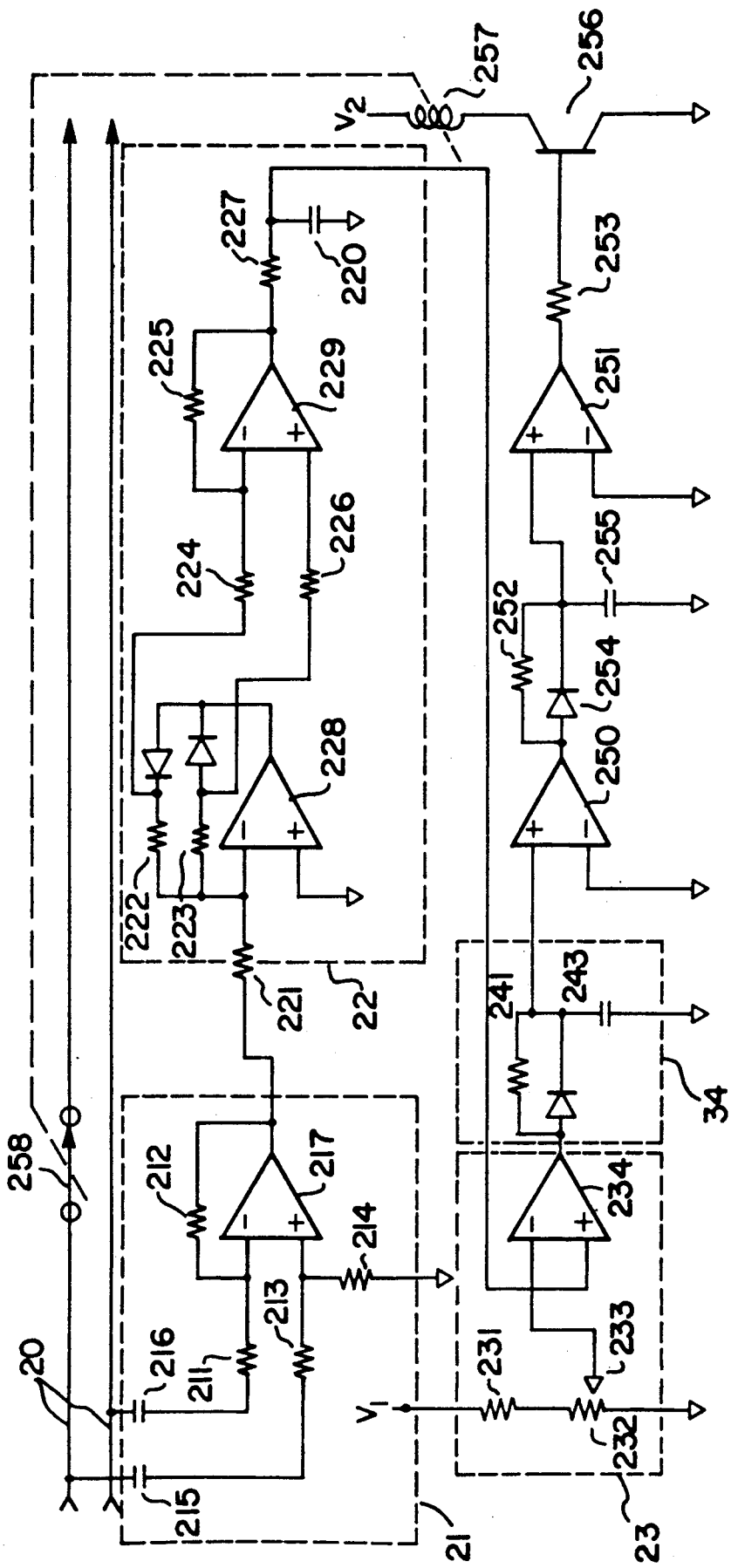
FIG_2

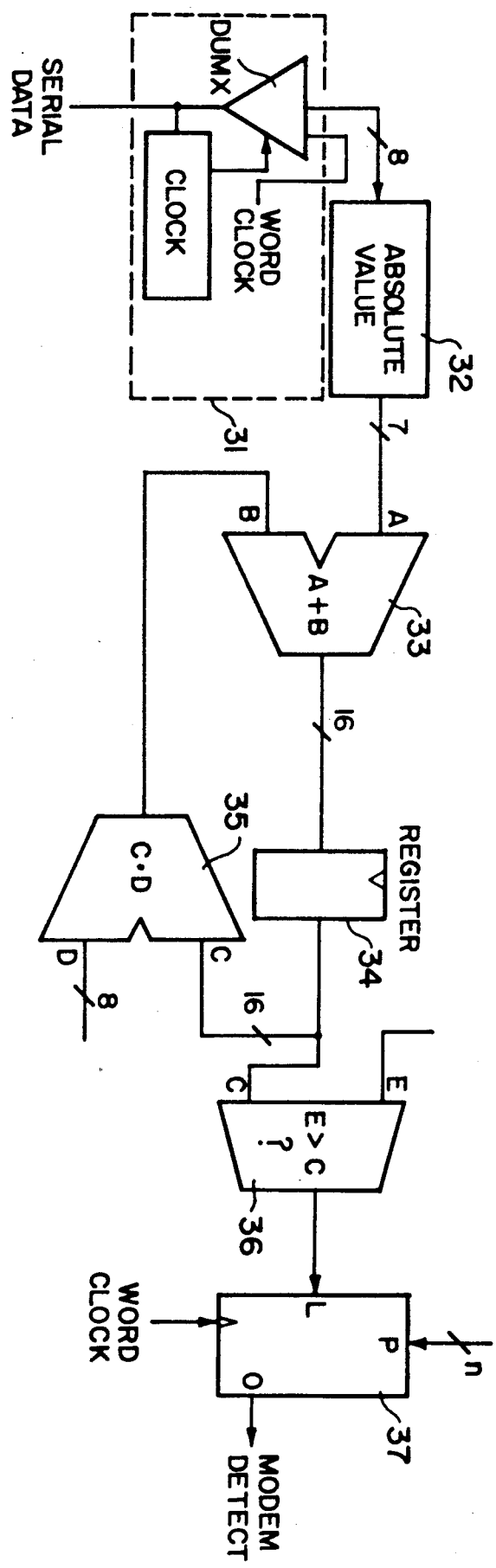
FIG_ 3

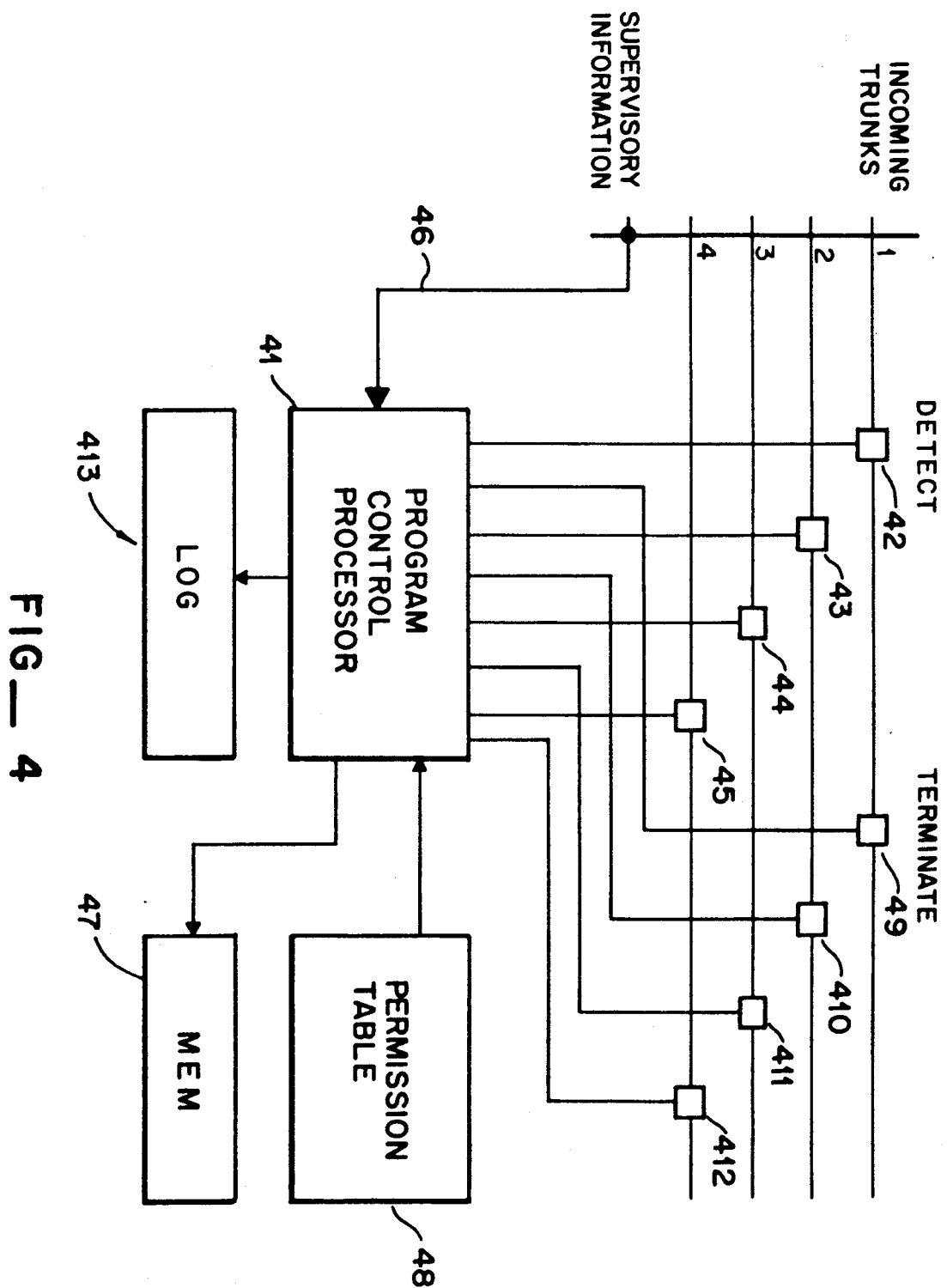
FIG—4

DEVICE TO BLOCK UNAUTHORIZED MODEM ACCESS OVER A PBX LINE

BACKGROUND OF THE INVENTION

This invention relates in general to data communication between computers using modems and relates more particularly to unauthorized modem access to computers. In the figures, the first digit of a reference numeral indicates the first figure in which the element designated by that numeral is presented.

In recent years widespread use of modems has occurred to enable computer users to access and transfer a wide variety of data. Modems are often used to access various databases, to transfer data between computers of different computer users and to enable remote access by a user of his or her own computer. For example, a sales representative can take a portable computer on a business trip and be able o access his or her own computer back at the office or to access a central computer to obtain up-to-date information for prospective customers. It has also become common to have a second computer at home for use outside of normal working hours or for occasions when it is convenient to work at home.

Unfortunately, such remote modem access of computers can make a computer system vulnerable to theft and/or loss of data by espionage or computer crackers. It is therefore important to prevent such unauthorized access to the extent possible. Unfortunately, many computers are now connecte together over communication networks (like that illustrated in FIG. 1) that increase the risk of unauthorized access.

FIG. 1 shows a set of users 11-17 connected to one another by a network consisting of a data switch 18 and a set of CPUs 111-113. Some of the users (11 and 12) are connected directly to the data switch, some of the users (13-15) are connected directly to a CPU, and some of the users (16 and 17) are connected indirectly to a CPU in the network. To protect the network from unauthorized external access, incoming modem access could be prohibited, but this would prevent useful or even necessary externally initiated access. Instead, modem access to the network can be centralized into one or more modem pools to centralize external access to the network. In one common approach shown in FIG. 1, all modem links to this network initiated by a user outside of this network are formed through an incoming modem pool 19 and all modem links from this network initiated by a user on the network are formed through an outgoing modem pool 110.

The modems in incoming modem pool 19 have an autoanswer capability so that when that modem is called by an outside user, the modem automatically answers the call and establishes the link to an internal user or CPU indicated by the outside user. The modems in outgoing modem pool 110 do not have an autoanswer capability so that no outside user can initiate a link to the network through outgoing modem pool 110. The effect of this is that all modem access by outside users is funnelled through the reduced set of modems in the incoming modem pool 19. Therefore, security precautions need only be applied to the reduced set of modems in pool 19.

In one type of security system called the "call back" security system, one of the CPUs (referred to herein as the "Protector") on the system ensures that only authorized users are allowed access to th network. The Protector contains a list of authorized users, the passwords of the authorized users and the phone numbers of the outside modems of these authorized users. When an outside user attempts to establish a modem link to the network, the Protector requests the outside user to enter the outside user's password. The Protector then terminates the modem access by that outside user and checks a table of authorized users to see if the entered password corresponds to the password of an authorized network user. If it does, then the Protector determines the phone number of the outside modem for that authorized user and calls that modem back. Therefore, to circumvent this protection, an unauthorized outside user must not only have determined the phone number for access to the incoming modem pool and the password of an authorized user, but must also be located at the location called by the Protector.

This call back security system limits access to only those phones listed in its list of authorized users and therefore prevents an authorized user, located away from that user's authorized phone, to access the system. This system would therefore prevent access from travelling sales representatives as well as any other systms users needing access while away from home. Therefore, some Protector systems also implement a query/response type of security system. In one example of the query/response security system, when the outside user seeks to establish modem access, the Protector queries the outside user for certain information and compares thereturned answers against listed correct answers. These questions are directed to information that should only be in the possession of the authorized user corresponding to the code entered by the user. For example, the questions might be about the user's Social Security number and his or her great anut's dog's name.

In another variant of the query/response security system, the Protector sends a coded piece of data to the outside user. This outside user then inputs this data into some type of encryption device, such as a calculator loaded with appropriate encryption code, to produce a response. Preferably, this encryption device includes a key that is unique to that user so that the received response from the user is uniquely determined. This response is then sent by the outside user to the Protector. The Protector compares the response to the correct response it should receive and allows modem access only when this response is correct.

Unfortunately, the Protector can be easily and unwittingly circumvented by any party who attaches a modem (such as modem 114) to any of the user's ports on that user's CPU on the network. Although most networks include internal protections such as the use of passwords for access to the network by internal users, it only takes one careless internal user to circumvent the internal security measures. It is therefore prudent to take all reasonable measures to prevent unauthorized access to any part of the network by unauthorized outside users because such access could compromise the data on the entire network.

SUMMARY OF THE INVENTION

If all authorized network users were aware of the security risks created by hooking modems to their computers and did not override known security procedures, the Protector type of security system discussed above could be adequate. However, new employees, uninformed employees and forgetful employees may not know or recall the risks while informed employees may still choose to override the security system to enable network access that they consider to be worth the security risk. It is therefore important to provide security against unauthorized modems connected to the network.

There are two main strategies for controlling modem access: blocking and monitoring. The blocking strategy attempts to render the audio channel unsuitable for modem use without affecting the usability for a normal phone user. Monitoring, on the other hand, attempts to detect the presence of a modem on a secured line to provide the options to log in the unauthorized access and/or hang up on the caller. Thus, all phone lines other than those connected to the Protector would be protected by some type of mechanism that blocks modem access or detects such access.

Unfortunately, it is difficult to block all types of modem access without disrupting the normal use of the audio channel. That this is so can be seen by considering the two main classes of modems in common use. The simpler of these is the Frequency Shift Keying (FSK) modems. This type of modem sends information by switching between two audio frequency tones (e.g., 1200 Hz and 2200 Hz). At each sampling point of the data stream, the presence of one of these frequencies indicates a binary value of 0 and the presence of the other of these frequencies indicates a binary value of 1. Because the baud rate of such a system is limited to a fraction of the frequency of the lower of these frequencies, this approach is typically utilized in the relatively low baud rate modems such as the Bell 202-type 300 baud modem.

The rate at which distinguishable pulses can be sent on a carrier centered in a communicaton link passband is less than or equal to the channel bandwidth. Because of this, signals transmitted over the phone lines having a passband from about 300 Hz to 3000 Hz are limited to less than 2700 baud. However, today there are 4800 and 9600 baud rate modems available. These higher baud rates are achieved by utilizing information contained in the amplitude and/or the phase of a pulse. In a Quadrature Amplitude Modulation type modem, the modem can distinguish four different amplitude levels and four different phases of the incoming signal relative to a synchronized clock signal, thereby providing 16 different data values for each incoming data bit. Since 16 levels corresponds to four binary bits of data, such systems have a four-fold increase in data transmission, thereby enabling transmission rates of up to 9600 baud even though the bandwidth is only 2700 Hz.

As the data rate goes up, so also goes the sophistication of the modem and the fragility of its connection. Some of the more finicky modems can be adequately blocked by putting a very narrow notch filter in the channel at a key frequency (such as the carrier frequency) of the modem. Unfortunately, key frequencies vary so that this type of protection could not protect against all modems.

Even the most robust low-speed QAM modems can be blocked by periodically adjusting the phase response of the channel with an allpass filter (which varies time delay as a function of frequency). In such a protection device, a set of phase modifying filters are randomly switched into the channel under control of a pseudo random bit sequence generator. Because the human ear is not particularly sensitive to phase irregularities, such a system would be transparent to normal users. Unfortunately, this approach does not protect against the frequency shift keying type modems since they are sensitive to the energy of a certain frequency of the incoming signal instead of to its phase.

Modems could also be detected by detecting the "echo-cancelling" tone generally transmitted by a modem at the initiation of transmission to disable any phone company equipment that might interfere with the modem operation. This signal is a 3–4 second tone of precise pitch sent at the very beginning of a modem connection. Unfortunately, this type of portection suffers from the following drawbacks:

(1) a cracker can disable the echo-cancelling tone;

(2) the tone is only present during the first few seconds of the call so that any round-robin method of checking incoming phane lines for such a tone must check each incoming line at intervals no greater than the interval of this tone; and (3) the tone is not used by the Frequency Shift Keying type of modems.

Because of the above analysis, the modem detection method implemented herein consists of sensing the average power of the phone line over a period of time. This method enables the detection of modems because, unlike speech which consists of talking spurts averaging 1 second in duration with average gaps of about a second or so (see, Bell Telephone Laboratories, Inc., *Transmission Systems for Communications*, Fourth Edition, copyright 1970, page 39), almost all modems attempt to maximize the line utilization by sending continuously without any gaps. Even when no data is ready to be sent, most modems will send idle characters to maintain the synchronization between transmitter and receiver. In addition, in order to minimize noise-induced errors, modems typically transmit data at the greatest amplitude possible. This further increases the average power transmitted by a modem. If the average power transmitted over the line over some selected interval exceeds a preselected level, then the modem protection can take an appropriate action such as hanging up on the modem and/or logging in this occurrence.

The incoming phone lines can be most easily protected by scanning the power on the phone lines that enter each facility before such lines branch at the local private branch exchange (PBX) into the much greater number of phone lines internal to that facility. Therefore, this modem detection should take place either within the phone company cable entering the facility or within the PBX for that facility. At a typical division-sized facility, the phone company cable contains on the order of 20 digital data lines (known as $T_1$ links), each of which carries the information for 24 one-way audio channels. The PBX then disperses out these 480 incoming audio channels to up to 6,000 phone lines. Therefore, the modem detector can be implemented in the digital domain to detect the signals on the $T_1$ lines or it can be implemented as an analog signal detector for use on the audio lines carying the up to 480 audio signals in a typical PBX. For the digital embodiment connected to the $T_1$ line, the incoming data includes the phone number of the sending phone link and therefore the Proctector can log in the number of the phone from which unauthorized modem access was attempted. It is becoming common for the sender's phone number to be available in both digital and analog transmission domains so that in a wide variety of settings, this information can be logged at the time of the detection of aunauthorized modem access. Other items that can be logged are the time of attempted access and the extension to which access was attempted.

DESCRIPTION OF THE FIGURES

FIG. 1 illustrates a typical network.
FIG. 2 is an analog embodiment of a modem detector.
FIG. 3 is a digital embodiment of a modem detector.
FIG. 4 illustrates the use of special program software to control modem access.

Description of the Preferred Embodiment

In FIG. 2 is presented an analog embodiment of a device for detecting whether a modem is connected to a phone line under test. This device measures the average power transmitted over the phone line and if this average power exceeds some threshold limit then the conclusion is made that a modem has accessed this phone line and corrective action is taken. This action can take a number of forms, including hanging up on that modem and/or logging in the occurrence of that access.

Op-amp circuitry 21 (consisting of a set of four 10K ohm resistors 211-214, a pair of 0.01 $\mu f$ capacitors 215-216, and an op-amp 217) is a differential amplifier that picks off a sample of the audio signals on the phone line 20. This amplified signal is fed to op-amp circuitry 22(consisting of a 5K ohm resistor 221, six 10K ohm resistors 222-227, a pair of op-amps 227-228 and a 2 $\mu f$ capacitor) which is a full wave rectifier and filter that converts the audio on the phone line into a smoothed DC signal. Op-amp circuitry 23 (consisting of voltage source $V_1$, 10K ohm resistor 231, 5K ohm resistor 232, sliding contact 233 and op-amp 234) is a comparator that establishes the minimum signal level that is considered to be a potential modem signal. Circuitry 24 (sonsisting of 200K ohm resistor 241, diode 242 and 50 $\mu f$ capacitor 243) create a nonlinear time constant. Capacitor 243 is quickly charged by diode 242 anytime there is a lull in the line energy. When the power on the line exceeds a certain threshold (set by sliding contact 233), then op-amp 234 attempts to discharge the capacitor through resistor 241. This time constant is set so that it requires about five seconds of uninterrupted high signal power on the line before interrupt circuitry 250-258 is activated to hang up on the modem. This interrupt circuitry consists of op-amps 250-251, 100K ohm resistor 252, 20K ohm resistor 253, diode 254 50 $\mu f$ farad capacitor 255, transistor 256, relay coil 257 and relay contact 258. The phone line remains disconnected until capacitor 255 discharges through resisstor 252. This takes about 3 seconds and ensures that the line is hung up.

A full system to control modem usage would consist of a multiplicity of these circuits, one per incoming analog line, along with a memory for storing access privilege information. As each call is routed to an internal extension, the modem control system would consult the privilege table to determine if modem access is allowed. If access is not allowed and a modem is detected, then the system would log the event and hang up on the caller.

FIG. 4 illustrates the use of a CPU 41 having special programming to control access of modems within a facility. A control processor 41 monitors a set a modem detectors (42-45) as well as the supervisory channel 46 from the central office. These lines can be monitored in parallel or can be monitored in a round-robin manner.

The supervisory channel indicates which local extension is to be connected to an incoming trunk. Control processor 41 stores this information in a memory 47 for possible later use if a modem is detected on one of the trunk lines. When modem access is detected, processor 41 checks memory 47 to determine what extension is connected to that trunk line. Controller 41 checks a permission table 48 to determine what action to take. The action can consist of any combination of hanging up on the modem by use of the appropriate one of call interrupters 49, 410, 411 and 412 or logging into log 413 data regarding such access. This data can include the time of modem detection and the phone number of the calling part as well as any other pertinent information.

For greater economy, it is desirable to perform the modem sensing function directly at the digital signal level on the T1 phone lines. A modem detector embodiment suitable for detecting such digital signals is shown in FIG. 3. Each of the 24 channels of a T1 phone line could have its own associated modem detector, but, for economy of hardware, a single modem detector can be used in a round-robin fashion to sample each of the 24 channels.

The serial digital data in a channel is fed through demultiplexor circuitry 31 to convert it to 8-bit parallel words of data. Each piece of data is rectified by clearing the sign bit in a rectifier 32. These smaples are digitally low-pass filtered with an 8bit adder 33, a 16-bit register memory 34 and a 16bit multiplier 35.

Demultiplexor 31 transmits to register memory 34 an address from 1 to 24 indicating which of the 24 channels corresponds to the current data provided to absolute value circuit 32. To simulate the RC filtering, each new sample is added to a slightly attenuated version of the contents of register memory 34 before storing it back in the register memory. The D input of multiplier 35 determines the decay time constant of this filter. For D $= 1 - \epsilon$ and a clock rate of R, the decay time of this filter is substantially equal to $\epsilon R$.

Register memory 34 consists of 24 16-bit registers which are addressed by the address output of demultiplexor 31. The digital value of each register indicates the average audio level on the line associated with that register. The output of register 34 is compared with a digital threshold level E in a 16-bit digital comparator 36. If the output of comparator 34 indicates that the threshold has been exceeded for a selected period (e.g., 5 seconds) with no drop-outs (i.e., an interval in which the signal level drops below the threshold) then it can be concluded that a modem has been detected.

To make this determination, a timeout counter such as presettable downcounter 37, having 24 registers is connected to the output of comparator 36. Each of these 24 registers is uniquely associated with one of the 24 serial data input channels so that a down-counter exists in register memory 34 for each of these 24 channels. An address line of downcounter 37 is connected to the address output of demultiplexor 31 to select the corresponding register for the channel being processed at that time. A load input L of downcounter 37 is connected to the output of comparator 36. If the output of comparator 36 indicates that the threshold has not been exceeded, then downcounter 37 is preset to a number n provided at an input P. At each successive clocking, the selected internal register of downcounter 37 is decremented if the threshold is not exceeded. If a register counts down to zero, then a Modem Detect output signal is produced at an output O of downcounter 37.

The number n is selected equal to the timeout time (i.e., the interval of uninterrupted power is indicative of modem access) divided by the interval between successive samples of a given channel.

The Modem Detect output signal acts as a flag indicating whether or not a modem link has been detected. A wide variety of responses to such a flag can be taken in response to such a flag, including hanging up on the modem and/or logging in the unauthorized access. Typical logged data can iclude the extension of the phone being accessed, the phone number from which the access is initiated and the time of detection of such access.

We claim:

1. A modem detector comprising:
    sampling means for sampling each of a plurality of audio lines, each functioning as a channel for transmission of data;
    an average power detector, having an input connected to the sampling means, for detecting the average power on each audio line that is sampled;
    means for comparing the detected average power on each sampled audio line with a threshold power level P that would be exceeded if a modem were operating on said line;
    means for determining whether said detected average power of a sampled line continuously exceeds said threshold power level P for a period longer than a reference period T, where T is selected to be longer than the time that this threshold power level is likely to be continuously exceeded by normal human speech; and
    means for indicating whether such detected average power has continuously exceeded said threshold P for longer than T.

2. A modem detector as in claim 1 further comprising means for setting said threshold power level, whereby this level can be adjusted to provide reliable operation for phone lines to noisy sites.

3. A modem detector as in claim 1 further comprising means for setting said reference period T, whereby this choice of T can be tailored to the average power fluctuation statistics of nonmodem phone traffic signals at each site.

4. A modem detector as in claim 1 that is responsive to digital data, whereby it is suitable for use with digital telephone trunk lines.

5. A modem detector as in claim 4 wherein said average power detector comprises:
    a digital rectifier having an input connected to said sampling means; and
    a digital low-pass filter connected to an output of the digital rectifier, the output of said digital low-pass filter providing a digital representation of the average power at the output of the sampling means.

6. A modem detector as in claim 5 wherein said digital low-pass filter comprises:
    a digital adder having a first input connected to an output of said digital rectifier, a second input and an output, said adder adding together a value A at its first input and a value b at its second input;
    a register memory having an address input connected to said average power detector for entry of an address that indicates the data channel currently being accessed by said average power detector, said register having an input connected to the output of the digital adder, having an output and being responsive to an address on said a address input to select a register uniquely associated with the address on said address input;
    a digital multiplier having a first input connected to the ouput of the register for entry of a first value C to produce at an output a value $B = C \cdot (1 - E)$ for some positive value $\epsilon$ less than 1, said multiplier output being connected to the second input of the digital adder.

7. A modem detector as in claim 6 whrerein said digital multiplier has a second input for entry of the factor $1 - \epsilon$, whereby a decay time factor of said digital low-pass filter can be varied by the user.

8. A modem detector as in claim 6 wherein said threshold detector comprises a digital comparator having a first input connected to an output of the digital filter and a second input connected to a digital representation E of said threshold power level P.

9. A modem detector as in claim 1 that is responsive to analog data, whereby it is suitable for use with analog phone lines.

10. A modem detector as in claim 9 wherein said average power detector comprises:
    an analog rectifier responsive to digital data at said sampling means; and
    an analog low-pass filter, with a time constant $t_c$, connected to an output of the analog rectifier, the output of said analog low-pass filter providing an analog representation of the average power of the output of the sampling means.

11. A modem detector as in claim 10 wherein said analog low-pass filter has a second input for varying $t_c$, whereby the averaging time constant of the analog low-pass filter can be varied by the user.

12. A modem detector as in claim 1 further comprising, means, responsive to said sensing means, for determining whether an audio line on which a modem has been detected is an authorized line for a modem.

13. A modem detector as in claim 12 further comprising means, responsive to said indicating means, for disconnecting each audio line on which unauthorized modem usage is detected.

14. A modem detector as in claim 12 further comprising means, responsive to said indicating means, for logging a phone number of a location from which an unauthorized modem access was attempted.

15. A modem detector that is responsive to digital data, said modem detector comprising:
    sampling means for sampling each of a plurality of audio lines, each functioning as a channel for transmission of data;
    a digital rectifier responsive to digital data at said sampling means;
    a digital low-pass filter connected to an output of the digital rectifier;
    a digital comparator having a first input connected to an output of the digital filter and a second input connected to a digital representation of a reference level P that would be exceeded if a modem were operating on said line; and
    a timeout counter connected to an output of the digital comparator, said timeout counter having an output on which is provided a modem detect signal indicative of whether this threshold P has been exceeded for longer than a time T that is selected to be longer than the time that this threshold power level is likely to be continuously exceeded by normal human speech.

16. A modem detector that is resposive to analog data, said modem detector comprising:

sampling means for sampling each of a plurality of an audio lines, each functioning as a channel for transmission of data;

an analog rectifier having an input connected to sampling means and having an output;

an analog low pass filter circuit;

a comparator connected to the analog rectifier output for comparing a signal on this output against a threshold value P that would be exceeded if a modem were operating on said line; and means for indicating whether this threshold P has been exceeded for longer than a time T that is selected to be longer than the time that this threshold power level is likely to be continuously exceeded by normal human speech.

* * * * *